(No Model.)

C. CLOSZ.
GRAIN SEPARATING SCREEN.

No. 434,248. Patented Aug. 12, 1890.

WITNESSES:
Philip F. Larner
Howell Bartle

INVENTOR
Charles Closz
BY
Johnson & Johnson
his ATTORNEYS.

THE NORRIS PETERS CO., PHOTO-LITHO., WASHINGTON, D. C.

UNITED STATES PATENT OFFICE.

CHARLES CLOSZ, OF ST. ANSGAR, IOWA.

GRAIN-SEPARATING SCREEN.

SPECIFICATION forming part of Letters Patent No. 434,248, dated August 12, 1890.

Application filed May 10, 1890. Serial No. 351,292. (No model.)

*To all whom it may concern:*

Be it known that I, CHARLES CLOSZ, a citizen of the United States, residing at St. Ansgar, in the county of Mitchell and State of Iowa, have invented new and useful Improvements in Grain-Separating Screens, of which the following is a specification.

My invention consists of a sheet-metal platform of peculiar construction for use in grain-cleaning separators, and especially for thrashing-machines, and the precise novelty of such construction will, in connection with the accompanying drawings, be pointed out in the claims concluding this specification.

Figure 1:
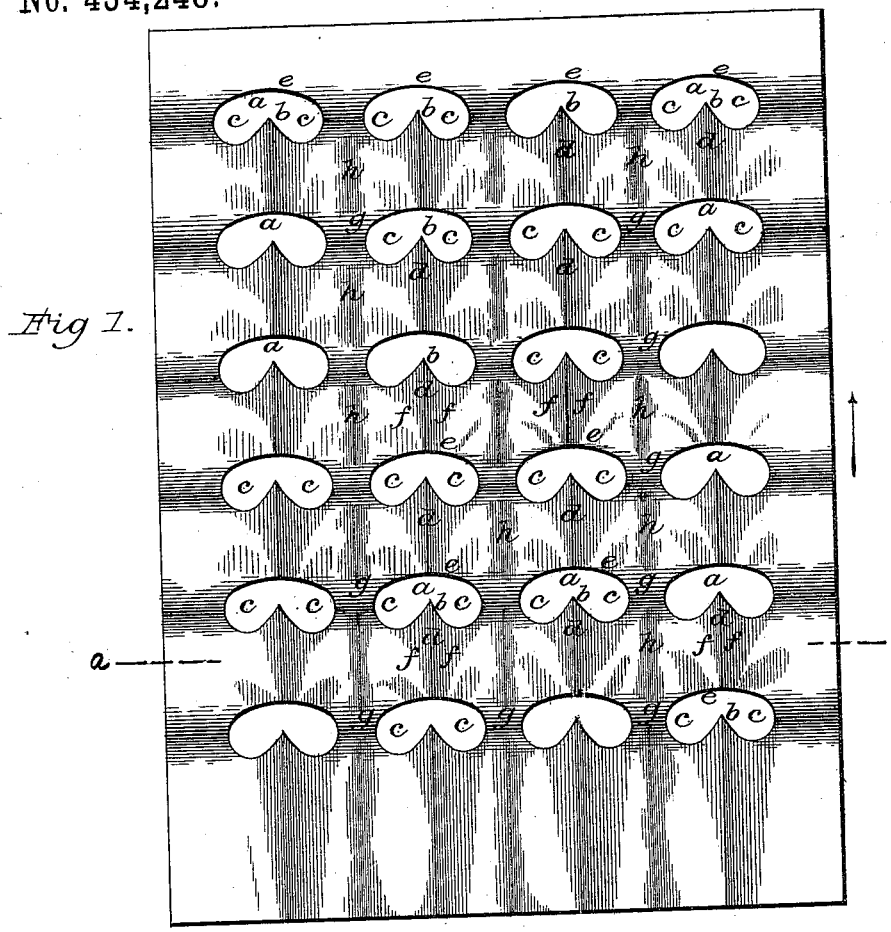
Figure 2:
Figure 3:
Figure 4:
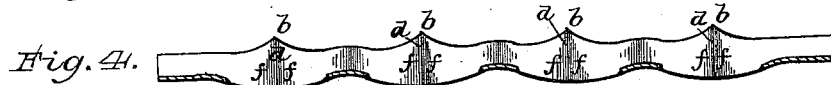
Figure 5:
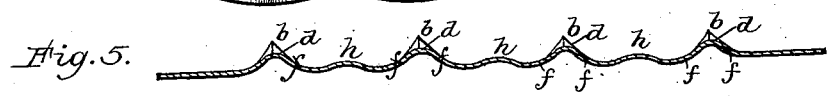

Referring to the drawings, Figure 1 is a top view of my improved grain-separating platform. Fig. 2 is a vertical longitudinal section of the same, taken on the center line of the openings and the raised spear-points. Fig. 3 is a similar section taken on the line of the inclined bridges between the openings. Fig. 4 is a transverse section taken on the line of the openings looking toward the discharge end of the platform; and Fig. 5 is a similar section taken on the line $a\ a$ of Fig. 1, looking toward the discharge.

The platform is of sheet metal, preferably of sheet-steel, and is formed with a peculiar open and undulating surface, which I have found well adapted for a preliminary separation of grain, straw, and other long stuff coming from the thrashing-machine. The openings $a$ are arranged in longitudinal and transverse rows, and they are of oblong and approximately heart shape. The surface, running transversely between the rows of openings, forms strips which stand inclined upward toward the discharge end of the platform, so that the front edges of these strips are raised above the plane of the platform-surface and their rear edges are on a level with such surface. At its front edge these inclined strips are formed with spear-points $b$, which project centrally forward at the middle of the rear or highest edge of each opening, and the edges of these spear-points are curved into enlarged rounded ends $c$ of the openings, so that the ends of the latter are wholly uncovered. From each spear-point a surface-ridge $d$ extends backward down the inclined strip to the lowest edge $e$ of the next opening, so as to form sloping sides $f$, which extend with the spear-point above the highest edge of the inclined strip. Between the spear-points the openings are separated by bridges $g$, which run in longitudinal lines and incline downward toward the discharge end of the platform from the highest rear edges of the openings to a level with their lowest front edges, and therefore the inclines of the transverse strips and of these bridges stand in opposite directions. Longitudinally in line with these inclined bridges the transverse inclined strips are formed with rigid surfaces $h$, the slopes from each side of which join the slopes $f$ on each side of the spear-points and terminate in the lowest front edges of the openings, which, with their enlarged circular ends and spear-points, resemble in shape a card-heart, which I find forms a very effective outlet for the grain and a very effective surface carrier and agitator for the straw and long stuff. By this construction the entire surface of the platform is made of wave-like slopes and inclined ridges, which merge into the lowest edges of the openings, the effect of which is to cause the straw to be carried over the openings on the spear-points, their slopes, and the highest edges of the transverse inclined strips to give free and full force to the air-blasts through the enlarged ends of the openings, and to separate the straw and allow the grain to pass through the openings. In fact, the entire contour of the surface of the platform is such as to offer the least hinderance to the movement of the straw and other long stuff, and the most complete collection of the grain toward the openings. This construction gives a surface in which there is no flat part, in which every part slopes toward one edge of the openings, and in which the straw will be practically free of such sloping surface, and the grain quickly cleared from the straw over the entire surface.

This separator is specially adapted for a side-shaking movement; but it may have a longitudinally-reciprocating movement.

In the drawings I have shown only the platform-separator, as its use in connection with a thrashing-machine is well understood and need not be shown. It will be understood, however, that the grain and straw are delivered from the thrashing-machine upon the inner end of the platform at B, and that the latter is suitably connected and supported for the shaking movement, and that it is set with an inclination toward the discharge end, or the platform may be operated in a horizontal position. The front edges of the openings are slightly beveled downward to prevent the straw catching thereon.

While I prefer to incline the bridges, as stated, yet they may be on the same level with the highest surface of the inclined strips.

I claim as my improvement—

1. A screen for grain-separators, constructed of a sheet-metal platform having openings of approximately heart shape arranged in transverse and longitudinal rows, the inclined shallow surface-ridges terminating in raised spear-points at the rear edges of said openings, the inclined bridges separating the ends of the openings and the shallow surface-ridges in longitudinal lines with said inclined bridges, the inclines of the spear-point ridges and the inclines of the bridges standing in opposite directions, and together forming surface slopes merging into the front edges of said openings, as shown and described.

2. A screen for grain-separators, constructed of a sheet-metal platform having openings of approximately heart shape arranged in transverse and longitudinal rows, the inclined surface-ridges terminating in spear-points at the rear edges of said openings and merging into the enlarged ends of the latter, as shown and described.

In testimony whereof I have hereunto set my hand in the presence of two subscribing witnesses.

CHARLES CLOSZ.

Witnesses:
A. E. H. JOHNSON,
PHILIP F. LARNER.